United States Patent
Mathada et al.

(10) Patent No.: US 11,781,878 B2
(45) Date of Patent: Oct. 10, 2023

(54) RECOMMEND ROUTES IN ENHANCED NAVIGATION SYSTEM

(71) Applicant: INTERNATIONAL BUSINESS MACHINES CORPORATION, Armonk, NY (US)

(72) Inventors: Prasanna Alur Mathada, Bangalore (IN); Srini Bhagavan, Overland Park, KS (US); Hrishikesh Sujaya Kumar, Bangalore (IN); Thuan D Ngo, Milpitas, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/453,524

(22) Filed: Nov. 4, 2021

(65) Prior Publication Data

US 2023/0138025 A1     May 4, 2023

(51) Int. Cl.
*G01C 21/34* (2006.01)
*G01C 21/36* (2006.01)

(52) U.S. Cl.
CPC ..... *G01C 21/3484* (2013.01); *G01C 21/3492* (2013.01); *G01C 21/3617* (2013.01); *G01C 21/3676* (2013.01)

(58) Field of Classification Search
CPC ............ G01C 21/3484; G01C 21/3492; G01C 21/3617; G01C 21/3676
See application file for complete search history.

(56) References Cited

U.S. PATENT DOCUMENTS 9,927,252 B1    3/2018   Chokshi
11,015,952 B1 *   5/2021   Lyle .................... G01C 21/367
(Continued)

FOREIGN PATENT DOCUMENTS

CN      108253983 A     7/2018
DE   102011120510 A1    6/2012
(Continued)

OTHER PUBLICATIONS

Amirgholy et al., "An Advanced Traveler Navigation System Adapted to Route Choice Preferences of the Individual Users", vol. 6, Issue 4, Dec. 2017, 34 Pages.
Chen et al., "Road Condition Monitoring Using On-board Three-axis Accelerometer and GPS Sensor", 2011, IEEE, 11 Pages.
(Continued)

*Primary Examiner* — Anne Marie Antonucci
*Assistant Examiner* — Patrick M Brady
(74) *Attorney, Agent, or Firm* — Robert R. Aragona

(57) ABSTRACT

An embodiment for recommending routes in an enhanced navigation system is provided. The embodiment may include receiving a destination from a primary user. The embodiment may also include obtaining a tentative list of routes. The embodiment may further include identifying each user and characteristics associated with each user. The embodiment may also include analyzing current conditions of the tentative list of routes and the characteristics. The embodiment may further include identifying one or more optimal routes. The embodiment may also include recommending the one or more optimal routes to the primary user. The embodiment may further include in response to determining the primary user selects an optimal route of the one or more optimal routes, presenting the selected optimal route on a navigation display to the primary user.

17 Claims, 8 Drawing Sheets

(56) References Cited

U.S. PATENT DOCUMENTS

| | | | | |
|---|---|---|---|---|
| 2005/0047864 | A1* | 3/2005 | Yamada | G01W 1/14 |
| | | | | 404/71 |
| 2015/0260531 | A1* | 9/2015 | Ehsani | G01C 21/3484 |
| | | | | 701/538 |
| 2018/0347996 | A1* | 12/2018 | Coleman | G01C 21/3667 |
| 2019/0094037 | A1* | 3/2019 | Jin | G08G 1/127 |
| 2019/0299999 | A1* | 10/2019 | Liu | G06V 20/597 |
| 2020/0217677 | A1* | 7/2020 | Wang | G01C 21/3461 |
| 2020/0378771 | A1* | 12/2020 | Beaurepaire | G01C 21/3461 |
| 2021/0039639 | A1* | 2/2021 | Song | G01C 21/3415 |
| 2021/0070304 | A1* | 3/2021 | Weldemariam | B60W 40/06 |
| 2022/0126864 | A1* | 4/2022 | Moustafa | G08G 1/096758 |

FOREIGN PATENT DOCUMENTS

| | | |
|---|---|---|
| EP | 3139131 B1 | 3/2020 |
| KR | 101826041 B1 | 3/2018 |

OTHER PUBLICATIONS

Disclosed Anonymously, "System and Method to Deduce Optimal Navigation Path, Gauging the Pollution Data, Assessing the Health History of Vehicle Occupants and Conditionally Recommending Appropriate Facial Masks, to Help Mitigate any Unforeseen Hazards", IPCOM000265227D, Mar. 17, 2021, 5 Pages.

leadingindia.ai, "Travel Route Suggestion Based on Pattern of Travel and Difficulties", Retrieved from Internet Oct. 25, 2021, 5 Pages. https://leadingindia.ai.

Libelium, "Smart Roads: Wireless Sensors to Monitor Road Conditions", Jan. 22, 2014, 5 Pages. https://www.youtube.com/watch?v=m-C1gmi1du0.

Mell et al., "The NIST Definition of Cloud Computing", Recommendations of the National Institute of Standards and Technology, NIST Special Publication 800-145, Sep. 2011, 7 pages.

Pawar et al., "Pothole Detection and Warning System using IBM Bluemix Platform", International Research Journal of Engineering and Technology (IRJET), vol. 03, Issue 11, Nov. 2016, 4 Pages.

\* cited by examiner

RECOMMEND ROUTES IN ENHANCED NAVIGATION SYSTEM

BACKGROUND

The present invention relates generally to the field of computing, and more particularly to a system for recommending routes in an enhanced navigation system.

Navigation systems, such as global positioning system (GPS) technology, have become an indispensable part of daily life. These navigation systems may provide a user with turn-by-turn directions from a starting point to a destination while walking or driving an automobile. Some navigation systems may also provide the user with mass transit commuting options, such as informing the user of train and/or bus stations within an area selected by the user. Currently, the user may apply certain filters to route options. These filters may include, but are not limited to, minimizing or maximizing freeways, minimizing the use of toll roads, choosing the length of voice prompts from the navigation system, and/or choosing whether lane guidance is enabled or disabled.

SUMMARY

According to one embodiment, a method, computer system, and computer program product for recommending routes in an enhanced navigation system is provided. The embodiment may include receiving a destination from a primary user. The embodiment may also include obtaining a tentative list of routes based on the destination. The embodiment may further include identifying each user and characteristics associated with each user. The embodiment may also include analyzing current conditions of the tentative list of routes and the characteristics associated with each user. The embodiment may further include identifying one or more optimal routes based on the current conditions and the characteristics. The embodiment may also include recommending the one or more optimal routes to the primary user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
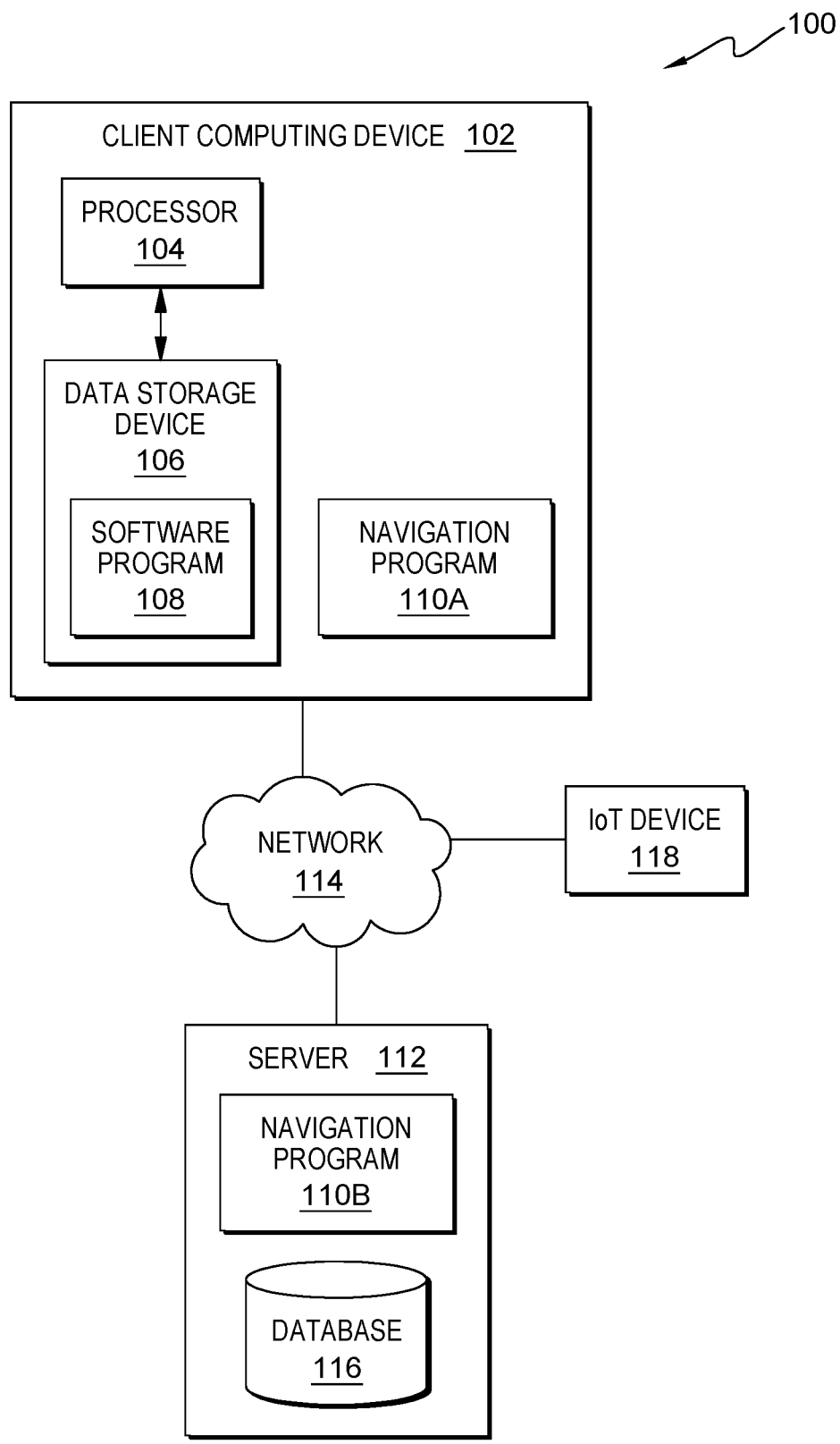
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for recommending routes in an enhanced navigation system. The following described exemplary embodiments provide a system, method, and program product to, among other things, identify each user and characteristics associated with each user and, accordingly, recommend at least one optimal route to a primary user based on current road conditions and the characteristics associated with each user. Therefore, the present embodiment has the capacity to improve global positioning system (GPS) technology by enhancing the functionality of current navigation systems.

As previously described, navigation systems, such as global positioning system (GPS) technology, have become an indispensable part of daily life. These navigation systems may provide a user with turn-by-turn directions from a starting point to a destination while walking or driving an automobile. Some navigation systems may also provide the user with mass transit commuting options, such as informing the user of train and/or bus stations within an area selected by the user. Currently, the user may apply certain filters to route options. These filters may include, but are not limited to, minimizing or maximizing freeways, minimizing the use of toll roads, choosing the length of voice prompts from the navigation system, and/or choosing whether lane guidance is enabled or disabled. Conventional navigation systems are limited in the types of information considered in calculating a route. For example, conventional navigation systems may consider traffic congestion when calculating a route. However, choosing a route in this manner fails to consider other important factors, such as roadway conditions and characteristics of the occupants of the automobile. It may therefore be imperative to have a system in place to consider all relevant information that could impact the safety of the occupants of the automobile when calculating a route. Thus, embodiments of the present invention may provide advantages including, but not limited to, leveraging data obtained from sensors on an internet of things (IoT) device, making the occupants of an automobile safer, and considering relevant information in real-time to calculate an optimal route. The present invention does not require that all advantages need to be incorporated into every embodiment of the invention.

According to at least one embodiment, when an automobile is navigating to a destination, a destination may be received from the primary user so that a tentative list of routes may be obtained based on the destination. Each user in the automobile and characteristics associated with each user may be identified. Upon identifying each user and the characteristics associated with each user, current conditions of the tentative list of roads and the characteristics associated with each user may be analyzed in order to identify one or more optimal routes based on the current conditions and characteristics. The one or more optimal routes may then be recommended to the primary user. According to at least one embodiment, in response to determining the primary user selects an optimal route of the one or more optimal routes, the optimal route may be presented on a navigation display to the primary user. According to at least one other embodiment, in response to determining the primary user does not select an optimal route of the one or more optimal routes, the tentative list of routes may be filtered based on a next best set of routes and a filtered route from the next best set of routes may be presented on the navigation display to the primary user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify each user and characteristics associated with each user and, accordingly, recommend at least one optimal route to a primary user based on current road conditions and the characteristics associated with each user.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a navigation program 110A and communicate with the server 112 and the IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running a navigation program 110B and a database 116 and communicating with the client computing device 102 and the IoT Device 118 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 includes a smart phone, tablet, or other wearable device having audio and visual recording systems as well as GPS capability. IoT Device 118 may also include sensors such as, but not limited to, an accelerometer, a gyroscope, light sensors, proximity sensors, a magnetometer, infrared sensors and/or any other sensors known in the art for capturing identities and characteristics of users that is capable of connecting to the communication network 114, and transmitting and receiving data with the client computing device 102 and the server 112.

According to the present embodiment, the navigation program 110A, 110B may be a program capable of receiving a destination from a primary user, identifying each user and characteristics associated with each user, recommending at least one optimal route to the primary user based on current road conditions and the characteristics associated with each user, leveraging data obtained from sensors on an IoT device, making the occupants of an automobile safer, and considering relevant information in real-time to calculate an optimal route. The enhanced navigation route recommendation method is explained in further detail below with respect to FIG. 2.

Figure 2:
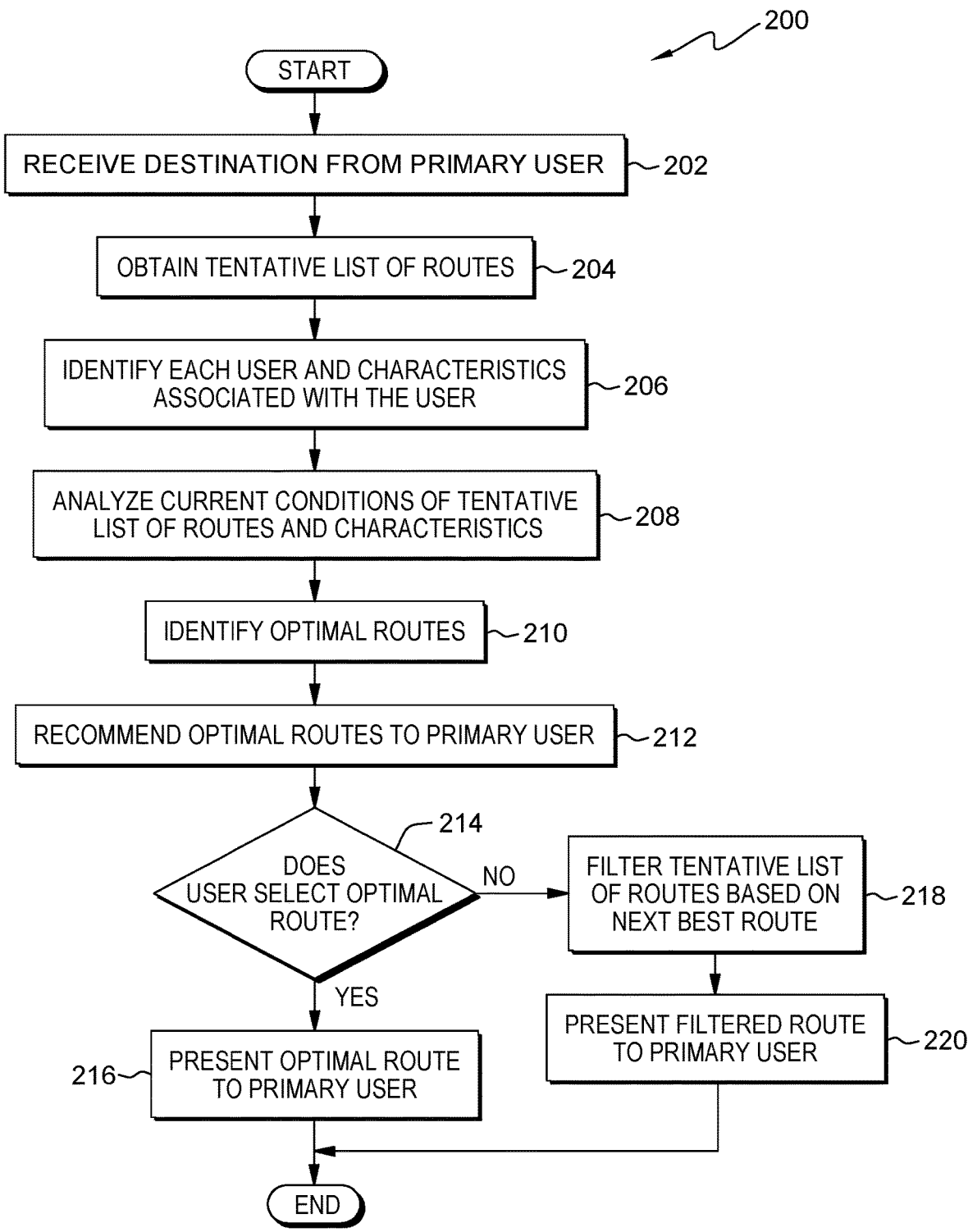
FIG. 2 illustrates an operational flowchart for recommending routes in an enhanced navigation system in an enhanced navigation route recommendation process according to at least one embodiment.

Referring now to FIG. 2, an operational flowchart for recommending routes in an enhanced navigation system in an enhanced navigation route recommendation process 200 is depicted according to at least one embodiment. At 202, the navigation program 110A, 110B receives the destination from the primary user. As used herein, the "primary user" is the driver of the automobile. The driver may be a professional, such as a livery or taxi driver, or an amateur, such as a single occupant or a person driving family members and/or acquaintances.

According to at least one embodiment, the primary user may input a destination directly into an in-dash navigation display, which may be received by the navigation program 110A, 110B. According to at least one other embodiment, the primary user may input a destination into their smartphone, which may itself be used as a navigation system. For example, the smartphone may have a navigation application like Google Maps™ (Google Maps and all Google Maps-based trademarks and logos are trademarks or registered trademarks of Google LLC and/or its affiliates). According to at least one further embodiment, the primary user may input a destination into an automobile's connected services application on the user's smartphone. For example, many automobile manufacturers allow the primary user to input a destination into a connected services application, and then provide the primary user with the option to send the destination to the automobile's in-dash navigation system. It may be appreciated that the examples described above are not intended to be limiting, and that in embodiments of the present invention the destination may be received in a variety of different ways.

Then, at 204, the navigation program 110A, 110B obtains the tentative list of routes. The tentative list of routes are obtained based on the destination. In embodiments of the present invention, the tentative list of routes may be obtained from a route repository hosting a plurality of navigation maps of routes for different types of automobiles. For example, certain routes in the route repository may be routes designed for commercial vehicles (e.g., trucks), whereas other routes in the route repository may be routes designed for passenger vehicles (e.g., cars). The tentative list of routes may be utilized to identify the one or more optimal routes, described in further detail below with respect to step 210.

Next, at 206, the navigation program 110A, 110B identifies each user and the characteristics associated with each user. As used herein, "each user" means any occupant of the automobile, including the primary user. For example, in a family of four, where one parent is driving, and the other parent along with the two children are passengers, there would be four users. Examples of characteristics associated with the user include, but are not limited to, health history, biometrics, age, weight, and/or an emotional state of each user.

The navigation program 110A, 110B may utilize the IoT Device 118 to identify each user. As described above, the IoT Device 118 may include a smart phone, tablet, or other wearable device having audio and visual recording systems as well as GPS capability. The IoT Device 118 may also include sensors such as, but not limited to, an accelerometer, a gyroscope, light sensors, proximity sensors, a magnetometer, infrared sensors and/or any other sensors known in the art for capturing identities and characteristics of users. It may be appreciated that in embodiments of the present invention, these sensors may be embedded in the automobile itself or may be embedded into a device of each user. According to at least one embodiment, the smartphone or tablet of each user may be paired wirelessly with the automobile. Many smartphones and tablets have associated names, such as "James's phone" or "Maggie's tablet." Thus, each user may be identified by a paired smartphone or tablet. According to at least one other embodiment, a voice surveillance system in the automobile may be used to identify the primary user, as well as other users who speak during the drive. For example, the voice surveillance system may be trained to recognize each user's voice. Additional details on identifying individual users are described below with respect to FIG. 4.

The navigation program 110A, 110B may also utilize the IoT Device 118 to identify at least some of the characteristics associated with each user. For example, each user's wearable device may capture biometric data associated with each user, such as the user's heartrate, body temperature, as well as blood oxygen levels. Additionally, visual surveillance, through the user's device or through cameras embedded in the automobile, may detect facial expressions of each user. For example, a smile may indicate that a user is happy, whereas a frown may indicate that the user is sad. Furthermore, a yawn may indicate the user is tired.

According to at least one embodiment, the navigation program 110A, 110B may build a relationship tree. The relationship tree may be built between the primary user and each other user occupying the automobile, depicting the relationship of each other user to the primary user. According to at least one embodiment, the relationship tree may identify the relationship as a familial relationship, such as two parents, a son, and a daughter. According to at least one other embodiment, the relationship tree may identify the relationship as a group of friends or acquaintances. For example, friends or acquaintances may be identified by each user's phone contacts and/or connections on social media.

The relationship tree may be built so that once each user is identified, the health history for each user may be extracted from a health repository. The health repository may host health data as well as the real-time biometric data from the IoT Device 118. In this manner, the health history of each user may be updated in real time utilizing the plurality of sensors. The relationship tree may be collapsed and rebuilt when any user exits the automobile and when any user enters the automobile. In this manner, the relationship tree may suit the current set of occupants in the automobile at any given time.

As described above, the characteristics associated with each user may include health history, biometrics, age, weight, and/or an emotional state of each user. Each of these characteristics may be associated with a health threshold score, where a lower score may indicate the user is able to handle more difficult road conditions. The health threshold score may be a score from 1-10, which may be compared against a road quality index, described in further detail below with respect to steps 208 and 210. For example, an age of 65 and over may be associated with a score of 8.5, whereas an age of 40 and under may be associated with a score of 6.5. In another example, certain ailments may be associated with a particular health threshold score. Continuing the example, high blood pressure may be associated with a score of 7.5, whereas a broken leg may be associated with a score of 8.5. It may be appreciated that the examples described above are not intended to be limiting, and that in embodiments of the present invention the health threshold score associated with a characteristic may be pre-configured differently.

Then, at 208, the navigation program 110A, 110B analyzes the current conditions of the tentative list of routes and the characteristics associated with each user. The current conditions may include information including, but not limited to, pot holes, flooding, paved or unpaved (e.g., tar or gravel), inclines, curves, bumps, and/or other conditions. Thus, prior to the trip taken by the current set of users, a road quality index may be assigned to each route in the tentative list of routes.

The current conditions may be extracted by the navigation program 110A, 110B from a route quality repository, which may host data on various aspects of road conditions. Initially, data from multiple users in a variety of different automobiles may be uploaded into the route quality repository. For example, several hours, days, or weeks before a current set of users take a trip, data from different users' trips may be uploaded into the route quality repository. According to at least one embodiment, these users may provide feedback by voice. For example, a user could say, "This route is slippery when wet," or "This route is bumpy." According to at least one other embodiment, the IoT Device 118 may collect data during the trips. For example, sensors in the automobile and/or sensors in the devices of different users may detect bumps, curves, inclines, and/or pot holes along the route. Thus, a road quality index may be assigned to each route of the tentative list of routes based on these conditions. For example, if three tentative routes ($R_1$, $R_2$, and $R_3$) are obtained to reach a particular destination, each of these routes may be assigned a road quality index from 1-10, where a higher number indicates a better route quality (e.g., fewer curves, bumps, and/or pot holes). For example, $R_1$ may have many pot holes, curves, and bumps and is unpaved. Therefore $R_1$ may be assigned a road quality index of 7.8. $R_2$ may have similar conditions to $R_1$, but is paved. Thus, $R_2$ may be assigned a road quality index of 8.5. $R_3$ may have a few inclines and a few curves, but is paved and has no pot holes or bumps. Thus, $R_3$ may be assigned a road quality index of 9.2. It may be appreciated that the examples described above are not intended to be limiting, and that in embodiments of the present invention the road quality index associated with a route may be configured differently.

According to at least one embodiment, the current set of users may update the road quality index while travelling along a route. For example, conditions on $R_3$, which was previously assigned a road quality index of 9.2, may have changed. Continuing the example, $R_3$ may have experienced heavy rain within the last hour and is now flooded. Thus, the road quality index of $R_3$ may be reduced to 8.6. In this manner, the road quality index may be dynamically updated so that other users in different automobiles can leverage this data.

The characteristics associated with each user may be analyzed by the navigation program 110A, 110B. As described above with respect to step 206, the characteristics associated with each user may include health history, biometrics, age, weight, and/or an emotional state of each user. Each of these characteristics may be analyzed and associated with a health threshold score, as described above, where a lower score may indicate the user is able to handle more difficult road conditions. For example, upon receiving the biometric data of a user, the navigation program 110A, 110B may analyze the data and determine the user has a heart rate of 80 beats per minute, a body temperature of 98° Fahrenheit, and a blood oxygen level of 95%. In addition, as described above, visual surveillance, through the user's device or through cameras embedded in the automobile, may detect facial expressions of each user. These facial expressions may also be analyzed to determine an emotional state of each user. For example, a smile may indicate that a user is happy, whereas a frown may indicate that the user is sad. Furthermore, a yawn may indicate the user is tired.

Next, at 210, the navigation program 110A, 110B identifies the one or more optimal routes. The one or more optimal routes are identified based on the current conditions and the characteristics. As described above with respect to step 208, each route in the tentative list of routes may be assigned a road quality index. This road quality index may be compared against the health threshold score of each user described above with respect to step 206. According to at least one embodiment, the navigation program 110A, 110B may apply the Random Forest algorithm to organize each user into a bucket. Each bucket may contain an individual user, the individual user's health threshold score, and the road quality index of a route. Continuing the example above with respect to step 208, $R_1$ has a road quality index of 7.8, $R_2$ has a road quality index of 8.5, and $R_3$ has a road quality index of 9.2. Assuming one user has a health threshold score of 8.5, three buckets may be created (i.e., a bucket for $R_1$, a bucket for $R_2$, and a bucket for $R_3$). Thus, a bucket may be created for an individual user for each route. The buckets for the individual user for each route may then by fed to a Probabilistic Context Free Grammar (PCFG) module, which may compare the road quality index of a route with the health threshold score of an individual user, and classify the routes in terms of the suitability of each route (e.g., least suitable, moderately suitable, and most suitable). In the example above, $R_1$ may be classified as least suitable and eliminated from the tentative list of routes, since $R_1$'s road quality index does not meet the health threshold score for this user. Thus, the one or more optimal routes now include $R_2$ and $R_3$.

Then, at 212, the navigation program 110A, 110B recommends the one or more optimal routes to the primary user. The one or more optimal routes may be recommended to the primary user, via audio and/or visual on a navigation display, in descending order from most suitable to moderately suitable. According to at least one embodiment, in order to validate the suitability of the one or more optimal routes, the navigation program 110A, 110B may apply the Naïve Bayes algorithm to convert the data extracted from the road quality repository into a frequency table. The frequency table may include the conditions and the occurrences of those conditions along each segment of a particular route. For example, the frequency table may be as follows:

| Condition | Yes | No |
| --- | --- | --- |
| Pot holes | 1 | 4 |
| Flooding | 3 | 5 |
| Paved | 2 | 3 |
| Inclines | 3 | 5 |
| Curves | 2 | 4 |
| Bumps | 1 | 3 |

Then, the Naïve Bayes algorithm may be used to create a likelihood table as follows:

| Condition | Yes | No | | |
| --- | --- | --- | --- | --- |
| Pot holes | 1 | 4 | =5/36 | .14 |
| Flooding | 3 | 5 | =8/36 | .22 |
| Paved | 2 | 3 | =5/36 | .14 |
| Inclines | 3 | 5 | =8/36 | .22 |
| Curves | 2 | 4 | =6/36 | .17 |
| Bumps | 1 | 3 | =4/36 | .11 |
| All | 12 =12/36 .33 | 24 =24/36 .66 | | |

Thus, for this particular route (e.g., $R_2$), the likelihood of a user choosing this route is 66%, and the likelihood of a user not choosing this route is 33%. If, for another route (e.g., $R_3$), the likelihood of a user choosing this route is higher (e.g., 75% likelihood to choose this route), then $R_3$ may be recommended to the primary user first and $R_2$ may be recommended to the primary user second.

Next, at 214, the navigation program 110A, 110B determines whether the primary user selects an optimal route of the one or more optimal routes. The navigation program 110A, 110B may prompt the user to select an optimal route, and the user may select "Yes" or "No." The user may make the selection by voice, or on the navigation display.

In response to determining the primary user selects an optimal route of the one or more optimal routes (step 214, "Yes" branch), the enhanced navigation route recommendation process 200 proceeds to step 216 to present the optimal route to the primary user. In response to determining the primary user does not select an optimal route of the one or more optimal routes (step 214, "No" branch), the enhanced navigation route recommendation process 200 proceeds to step 218 to filter the tentative list of routes based on previously travelled routes.

Then, at 216, the navigation program 110A, 110B presents the selected optimal route on a navigation display to the primary user. According to at least one embodiment, when the selected optimal route is presented to the primary user, the navigation program 110A, 110B may annotate the navigation display with a marking including, but not limited to, a symbol, a sign, and/or a textual notation indicating obstacles on the selected optimal route, described in further detail below with respect to FIG. 3.

Next, at 218, the navigation program 110A, 110B filters the tentative list of routes based on the next best set of routes. If the primary user opts not to select an optimal route, then the navigation program 110A, 110B may discard any tentative route that was not chosen by the primary user. For example, if the available tentative routes are $R_1$, $R_2$, $R_3$, $R_4$, and $R_5$, of which $R_1$, $R_2$, and $R_3$ are optimal, and the primary user did not choose any of $R_1$, $R_2$, and $R_3$, then $R_1$, $R_2$, and $R_3$ may be discarded. Continuing the example, the next best set of routes would be $R_4$ and $R_5$.

Then, at 220, the navigation program 110A, 110B presents a filtered route from the next best set of routes on a navigation display to the primary user. Continuing the example above where $R_4$ and $R_5$ are the next best set of routes, the navigation program 110A, 110B may present the filtered route with the fastest estimated time of arrival (ETA), or the filtered route with the shortest distance. Similar to step 216, the navigation display may be annotated with a marking including, but not limited to, a symbol, a sign, and/or a textual notation indicating obstacles on the filtered route.

Figure 3:
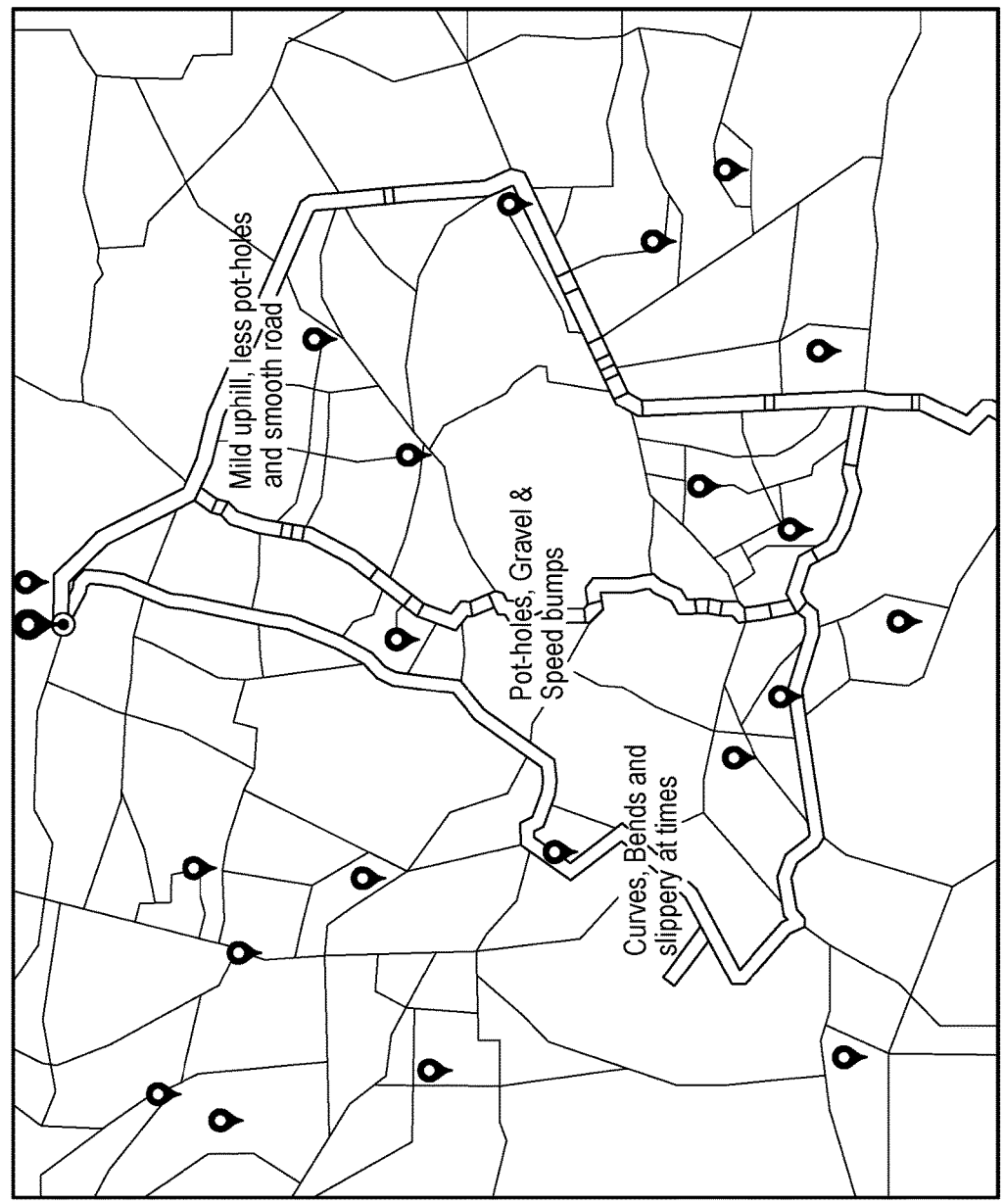
FIG. 3 is a diagram depicting an enhanced navigation system map according to at least one embodiment.

Referring now to FIG. 3, a diagram 300 depicting an enhanced navigation system map is shown according to at least one embodiment. The diagram 300 illustrates three optimal routes along with the ETA and distance to the destination for each route. The map includes a textual notation indicating obstacles on each route. Along one route, the textual notation is "Curves, Bends and slippery at times." Along another route, the textual notation is "Pot-holes, Gravel & Speed bumps." Along a further route, the textual notation is "Mild uphill, less pot-holes and smooth road." It may be appreciated that the examples described above are not intended to be limiting, and that in embodiments of the present invention the textual notation may be written differently.

Figure 4:
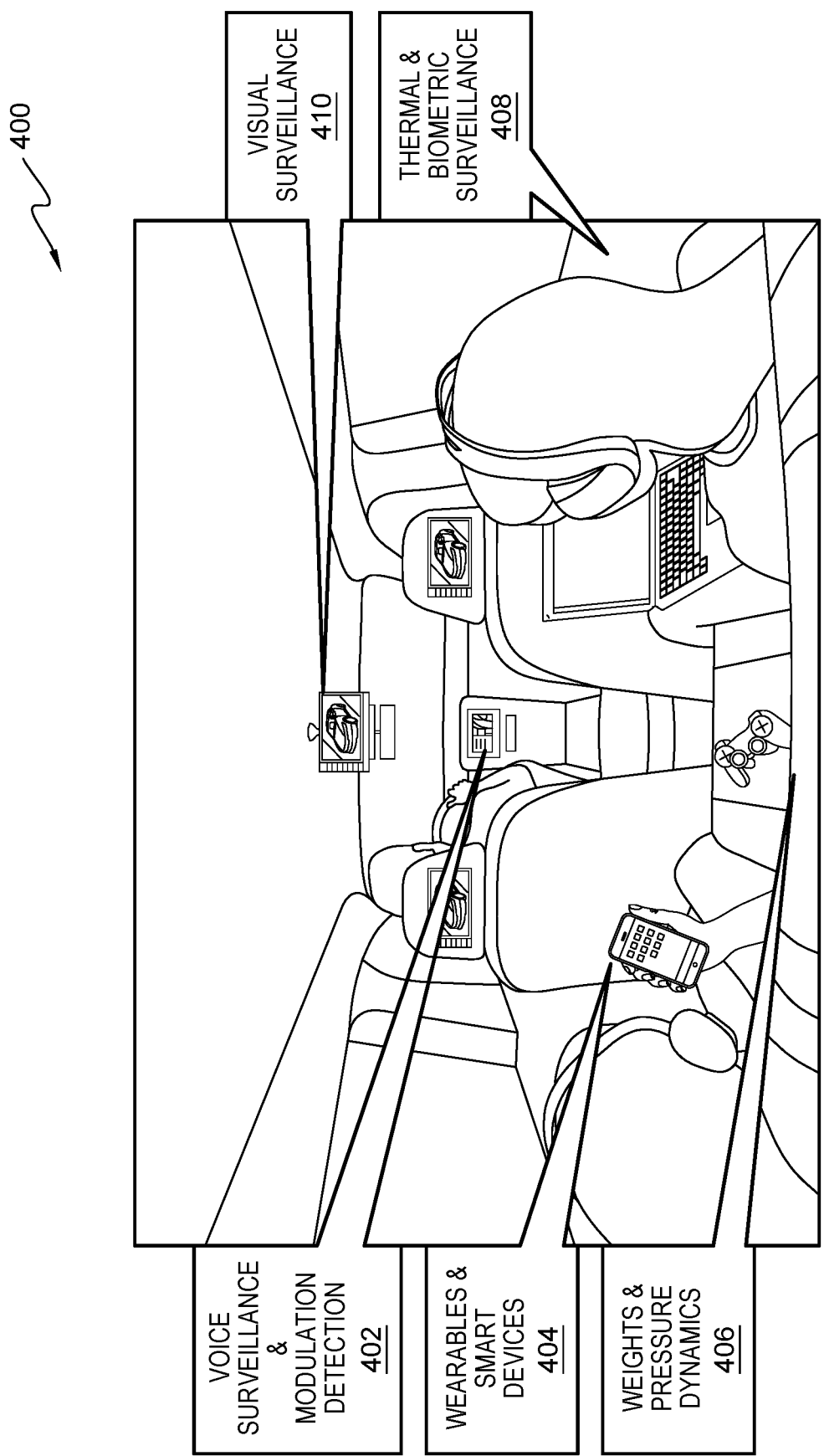
FIG. 4 is a diagram depicting how users and characteristics are identified according to at least one embodiment.

Referring now to FIG. 4, a diagram 400 depicting how users and characteristics are identified is shown according to at least one embodiment. A voice surveillance and modulation detection system 402 in the automobile may be used to identify the primary user, as well as other users who speak during the drive. For example, the voice surveillance and modulation detection system 402 may be trained to recognize each user's voice. According to at least one other embodiment, the smart devices and wearables 404 of each user may be paired wirelessly with the automobile. Many smart devices and wearables 404 have associated names, such as "James's phone" or "Maggie's watch," and these names may identify each user. According to at least one further embodiment, weight and pressure dynamics 406 of the user on a seat may be utilized to identify the user. For example, if the same weight and pressure dynamics 406 are applied to the same seat over several trips, the navigation program 110A, 110B may learn the identity of the user who is sitting in that seat.

According to at least one embodiment, thermal and biometric surveillance data 408 may be used to identify certain characteristics of the user, such as whether the user has a high heart rate, a fever, a high body temperature, and/or an adequate blood oxygen level. According to at least one other embodiment, a visual surveillance system 410 may also be used to identify certain characteristics of the user, such as whether the user is happy, sad, or tired.

Figure 5:
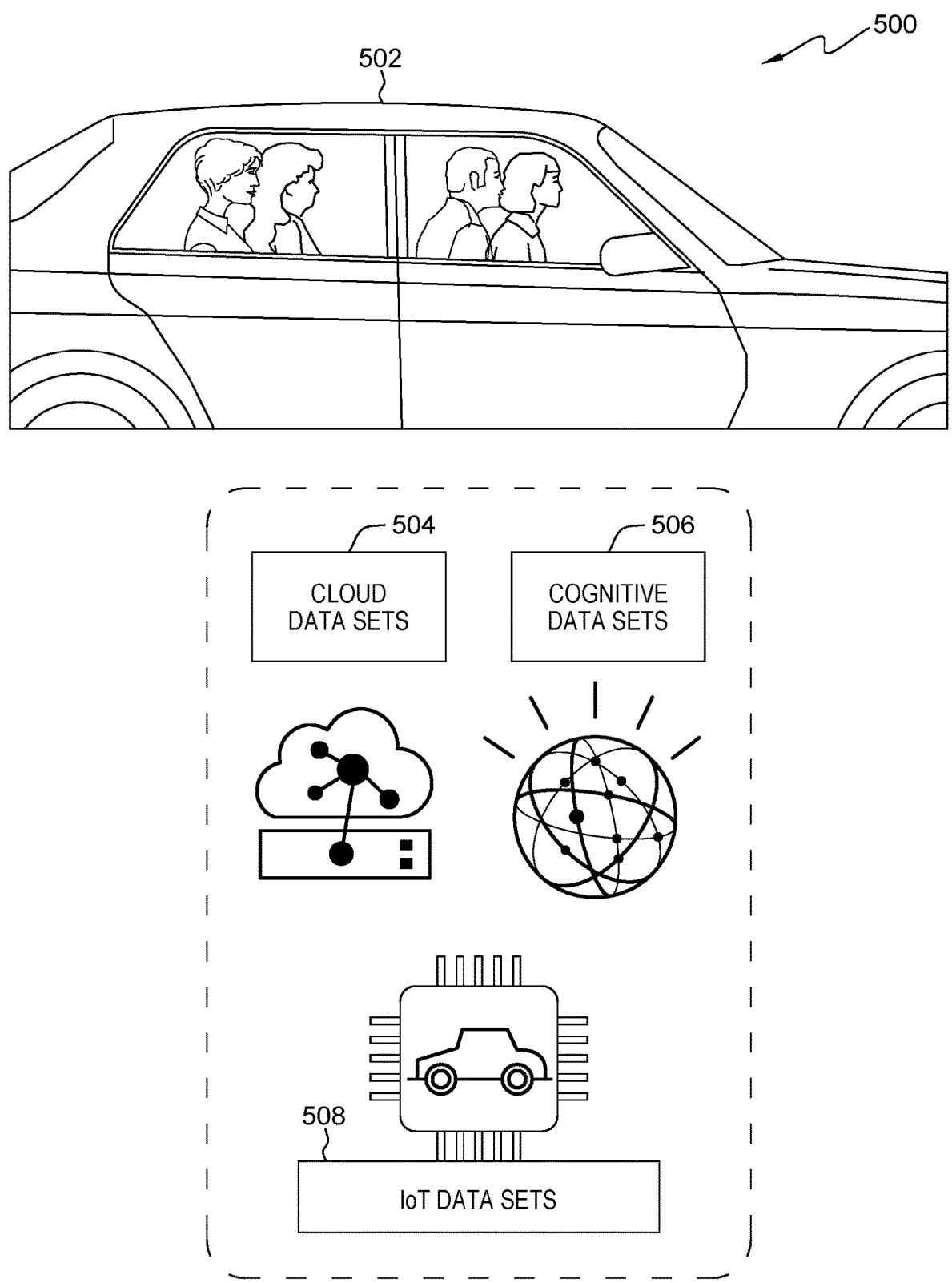
FIG. 5 is a diagram depicting an example of datasets that are leveraged in the process of FIG. 2 according to at least one embodiment.

Referring now to FIG. 5, a diagram 500 depicting an example of datasets that are leveraged in the process of FIG. 2 is shown according to at least one embodiment. In the diagram 500, a plurality of users are riding in an automobile 502. Cloud datasets 504 may include data on various aspects of road conditions, data on health history and biometrics of each user, and data on navigation maps of routes for different types of automobiles. The cloud datasets 504 may also include social media data, such as social media connections between each user. Cognitive datasets 506 may include voice and visual data described above with respect to FIG. 4. IoT datasets 508 may include sensor data obtained from the IoT Device 118.

It may be appreciated that FIGS. 2-5 provide only an illustration of one implementation and do not imply any limitations with regard to how different embodiments may be implemented. Many modifications to the depicted environments may be made based on design and implementation requirements.

Figure 6:
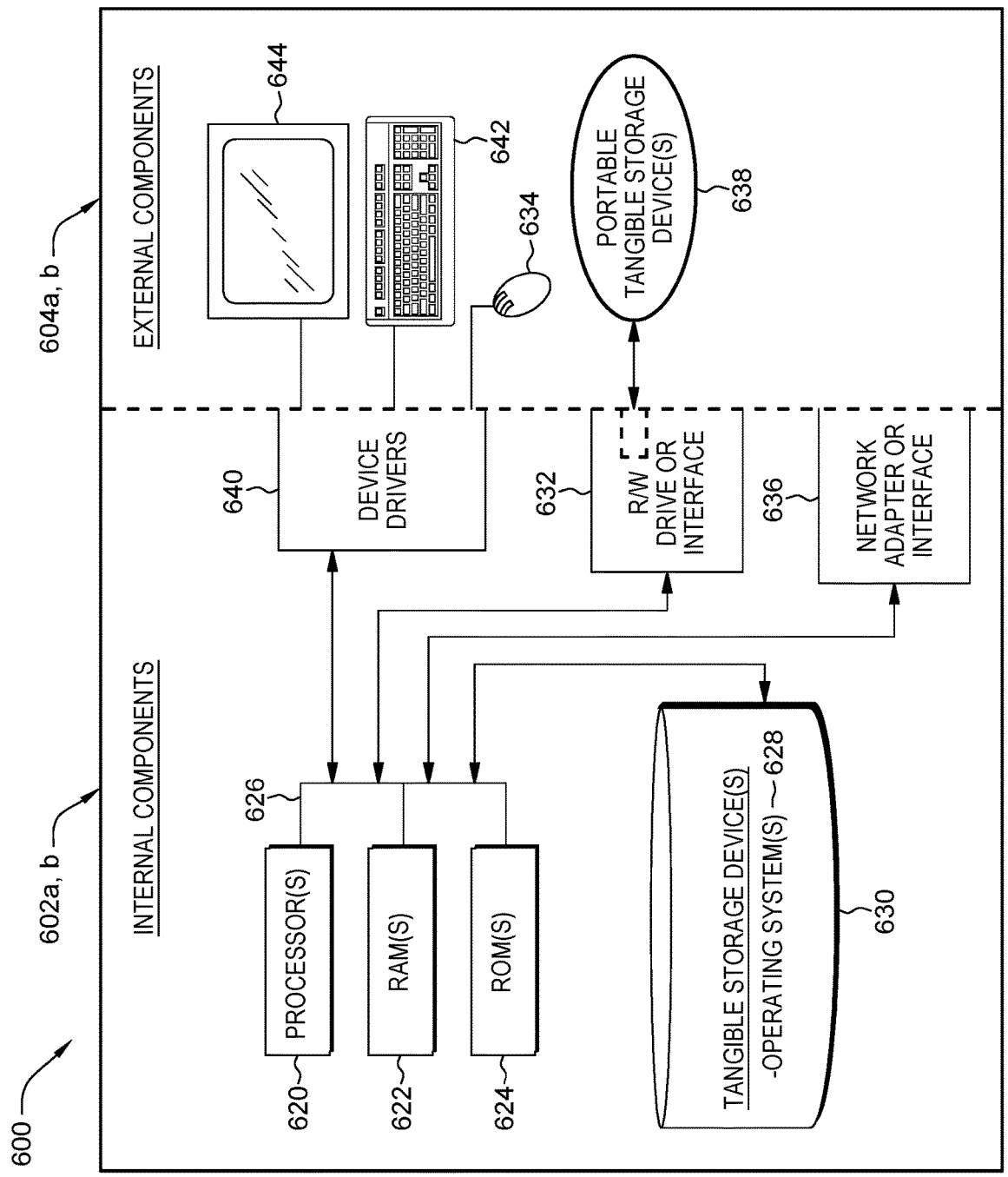
FIG. 6 is a functional block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 a,b and external components 604 a,b illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software program 108 and the navigation program 110A in the client computing device 102 and the navigation program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the navigation program 110A, 110B, can be stored on one or more of the respective portable computer-readable tangible storage devices 638, read via the respective R/W drive or interface 632, and loaded into the respective hard drive 630.

Each set of internal components 602 *a,b* also includes network adapters or interfaces 636 such as a TCP/IP adapter cards, wireless Wi-Fi interface cards, or 3G or 4G wireless interface cards or other wired or wireless communication links. The software program 108 and the navigation program 110A in the client computing device 102 and the navigation program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the software program 108 and the navigation program 110A in the client computing device 102 and the navigation program 110B in the server 112 are loaded into the respective hard drive 630. The network may comprise copper wires, optical fibers, wireless transmission, routers, firewalls, switches, gateway computers and/or edge servers.

Each of the sets of external components 604 *a,b* can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
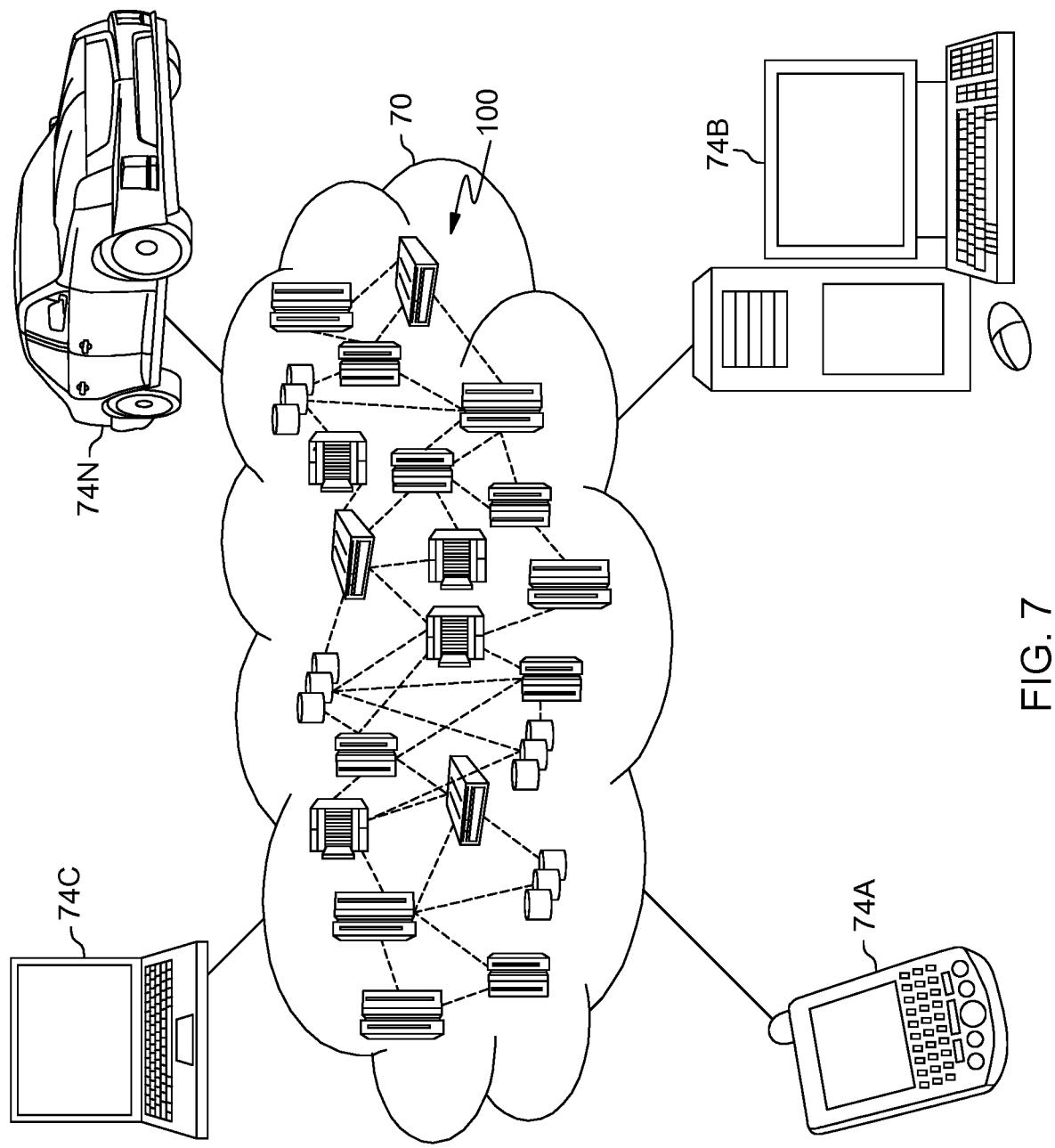
FIG. 7 depicts a cloud computing environment according to an embodiment of the present invention.

Referring now to FIG. 7, illustrative cloud computing environment 70 is depicted. As shown, cloud computing environment 70 comprises one or more cloud computing nodes 100 with which local computing devices used by cloud consumers, such as, for example, personal digital assistant (PDA) or cellular telephone 74A, desktop computer 74B, laptop computer 74C, and/or automobile computer system 74N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 70 to offer infrastructure, platforms and/or software as services for which a cloud consumer does not need to maintain resources on a local computing device. It is understood that the types of computing devices 74A-N shown in FIG. 7 are intended to be illustrative only and that computing nodes 100 and cloud computing environment 70 can communicate with any type of computerized device over any type of network and/or network addressable connection (e.g., using a web browser).

Figure 8:
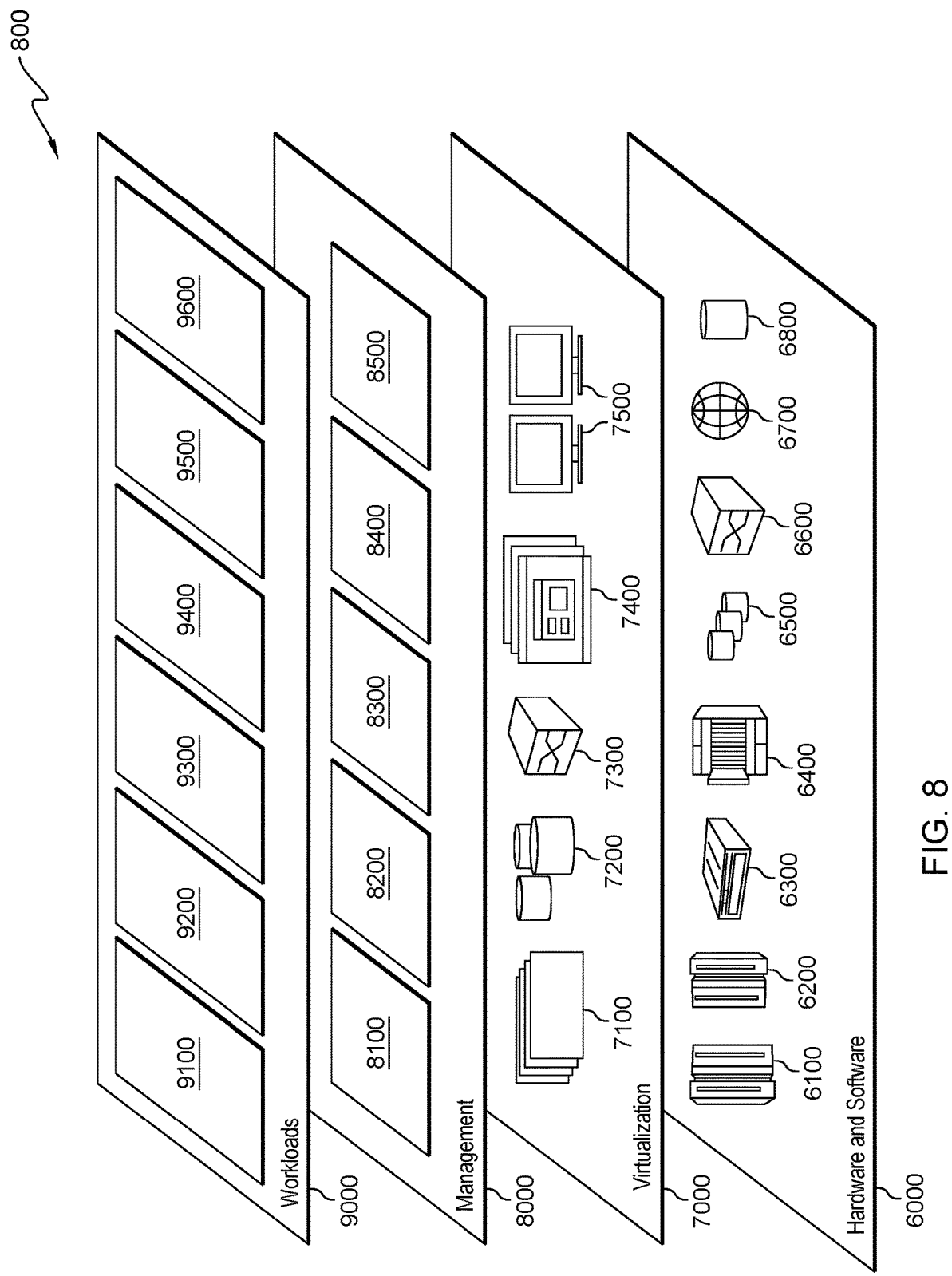
FIG. 8 depicts abstraction model layers according to an embodiment of the present invention.

Referring now to FIG. 8, a set of functional abstraction layers 800 provided by cloud computing environment 70 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and recommending routes in an enhanced navigation system 9600. Recommending routes in an enhanced navigation system 9600 may relate to identifying each user and characteristics associated with each user in order to recommend at least one optimal route to a primary user based on current road conditions and the characteristics associated with each user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of recommending routes in an enhanced navigation system, the method comprising:
  receiving a destination from a primary user;
  obtaining a tentative list of routes based on the destination;
  identifying each user and characteristics associated with each user, wherein identifying each user and the characteristics associated with each user further comprises:
    using a wearable device and at least one camera to capture biometrics and facial expressions of each user; and
    building a relationship tree between the primary user occupying an automobile and each other user occupying the automobile, wherein the relationship tree includes the captured biometrics and facial expressions of each user;
  analyzing current conditions of the tentative list of routes and the characteristics associated with each user;
  identifying one or more optimal routes based on the current conditions and the characteristics including the captured biometrics and facial expressions of each user contained in the relationship tree, wherein identifying the one or more optimal routes further comprises:
    organizing each user in the relationship tree into a bucket, wherein each bucket includes exactly one user, a numerical health threshold score of the exactly one user, and a numerical road quality index; and
    comparing the numerical road quality index against the numerical health threshold score for each user; and
  recommending the one or more optimal routes to the primary user.

2. The method of claim 1, further comprising:
  in response to determining the primary user selects an optimal route of the one or more optimal routes, presenting the selected optimal route on a navigation display to the primary user.

3. The method of claim 2, wherein presenting the selected optimal route further comprises:
  annotating the navigation display with a marking selected from a group consisting of a symbol, a sign, and a textual notation indicating obstacles on the selected optimal route.

4. The method of claim 2, wherein at least one of the characteristics is a health history of each user, wherein the health history of each user is updated in real-time utilizing a plurality of sensors.

5. The method of claim 1, further comprising:
  in response to determining the primary user does not select an optimal route of the one or more optimal routes, filtering the tentative list of routes based on a next best set of routes; and presenting a filtered route from the next best set of routes on a navigation display to the primary user.

6. The method of claim 1, wherein the relationship tree is rebuilt when any user exits the automobile and when any user enters the automobile.

7. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving a destination from a primary user;
obtaining a tentative list of routes based on the destination;
identifying each user and characteristics associated with each user, wherein identifying each user and the characteristics associated with each user further comprises:
using a wearable device and at least one camera to capture biometrics and facial expressions of each user; and
building a relationship tree between the primary user occupying an automobile and each other user occupying the automobile, wherein the relationship tree includes the captured biometrics and facial expressions of each user;
analyzing current conditions of the tentative list of routes and the characteristics associated with each user;
identifying one or more optimal routes based on the current conditions and the characteristics including the captured biometrics and facial expressions of each user contained in the relationship tree, wherein identifying the one or more optimal routes further comprises:
organizing each user in the relationship tree into a bucket, wherein each bucket includes exactly one user, a numerical health threshold score of the exactly one user, and a numerical road quality index; and
comparing the numerical road quality index against the numerical health threshold score for each user; and
recommending the one or more optimal routes to the primary user.

8. The computer system of claim 7, further comprising:
in response to determining the primary user selects an optimal route of the one or more optimal routes, presenting the selected optimal route on a navigation display to the primary user.

9. The computer system of claim 8, wherein presenting the selected optimal route further comprises:
annotating the navigation display with a marking selected from a group consisting of a symbol, a sign, and a textual notation indicating obstacles on the selected optimal route.

10. The computer system of claim 8, wherein at least one of the characteristics is a health history of each user, wherein the health history of each user is updated in real-time utilizing a plurality of sensors.

11. The computer system of claim 7, further comprising:
in response to determining the primary user does not select an optimal route of the one or more optimal routes, filtering the tentative list of routes based on a next best set of routes; and
presenting a filtered route from the next best set of routes on a navigation display to the primary user.

12. The computer system of claim 7, wherein the relationship tree is rebuilt when any user exits the automobile and when any user enters the automobile.

13. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving a destination from a primary user;
obtaining a tentative list of routes based on the destination;
identifying each user and characteristics associated with each user, wherein identifying each user and the characteristics associated with each user further comprises:
using a wearable device and at least one camera to capture biometrics and facial expressions of each user; and
building a relationship tree between the primary user occupying an automobile and each other user occupying the automobile, wherein the relationship tree includes the captured biometrics and facial expressions of each user;
analyzing current conditions of the tentative list of routes and the characteristics associated with each user;
identifying one or more optimal routes based on the current conditions and the characteristics including the captured biometrics and facial expressions of each user contained in the relationship tree, wherein identifying the one or more optimal routes further comprises:
organizing each user in the relationship tree into a bucket, wherein each bucket includes exactly one user, a numerical health threshold score of the exactly one user, and a numerical road quality index; and
comparing the numerical road quality index against the numerical health threshold score for each user; and
recommending the one or more optimal routes to the primary user.

14. The computer program product of claim 13, further comprising:
in response to determining the primary user selects an optimal route of the one or more optimal routes, presenting the selected optimal route on a navigation display to the primary user.

15. The computer program product of claim 14, wherein presenting the selected optimal route further comprises:
annotating the navigation display with a marking selected from a group consisting of a symbol, a sign, and a textual notation indicating obstacles on the selected optimal route.

16. The computer program product of claim 14, wherein at least one of the characteristics is a health history of each user, wherein the health history of each user is updated in real-time utilizing a plurality of sensors.

17. The computer program product of claim 13, further comprising:
in response to determining the primary user does not select an optimal route of the one or more optimal routes, filtering the tentative list of routes based on a next best set of routes; and
presenting a filtered route from the next best set of routes on a navigation display to the primary user.

* * * * *